May 22, 1923.                                                    1,455,923
N. MININBERG
APPARATUS FOR PRODUCING FLAKED AND OTHER FOOD PRODUCTS
Filed July 5, 1921
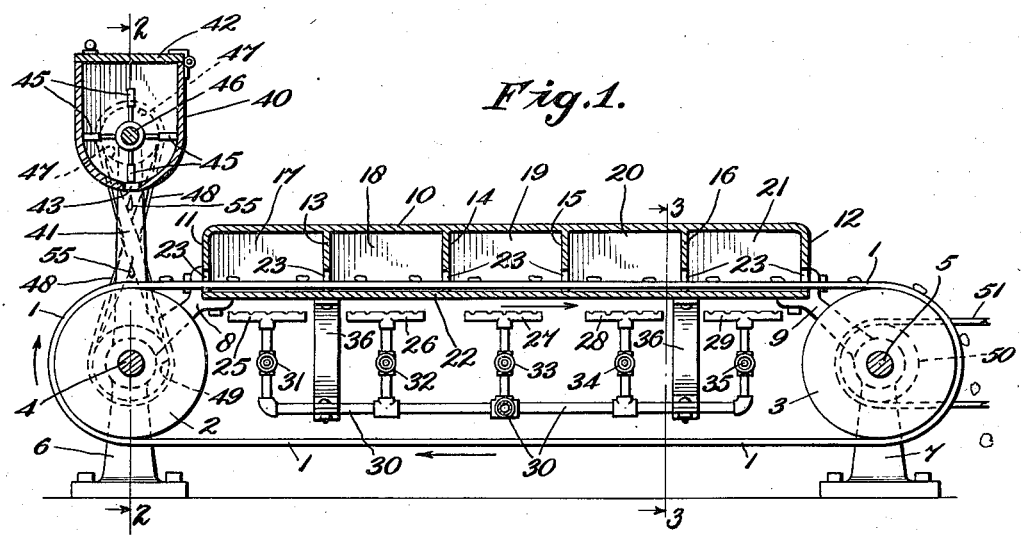
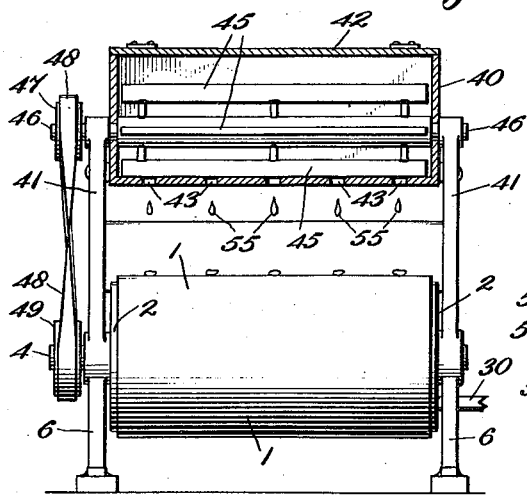
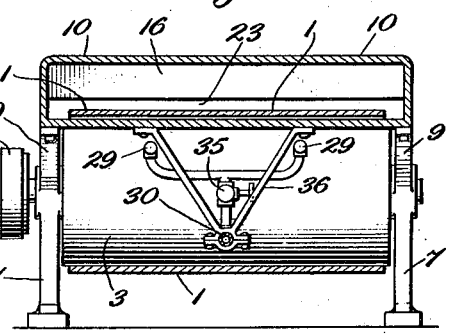
Inventor
Nathan Mininberg,
By  T. C. Witherspoon
Attorney Patented May 22, 1923.

1,455,923

UNITED STATES PATENT OFFICE.

NATHAN MININBERG, OF DICKINSON, NORTH DAKOTA, ASSIGNOR TO BRAN PRODUCTS COMPANY, OF DICKINSON, NORTH DAKOTA, A CORPORATION OF NORTH DAKOTA.

APPARATUS FOR PRODUCING FLAKED AND OTHER FOOD PRODUCTS.

Application filed July 5, 1921. Serial No. 482,392.

*To all whom it may concern:*

Be it known that I, NATHAN MININBERG, a citizen of the United States, residing at Dickinson, in the county of Stark and State of North Dakota, have invented certain new and useful Improvements in Apparatus for Producing Flaked and Other Food Products; and I do hereby declare the following to be a full, clear, and exact description of the invention, such as will enable others skilled in the art to which it appertains to make and use the same.

This invention relates to an apparatus for producing flaked and other food products, such, for example, as that disclosed in my copending application #463,957, filed April 23, 1921, and entitled "Flaked food product and process of producing the same," and has for its object to produce an apparatus of this character which will be simple in construction, comparatively inexpensive to manufacture, and more efficient in use than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a diagrammatic longitudinal sectional view partly in elevation of one form of apparatus made in accordance with the present invention;

Figure 2 is a transverse vertical sectional view taken approximately on the line 2—2 of Figure 1, looking in the direction of the arrows; and Figure 3 is a view similar to Figure 2, taken approximately on the line 3—3 of Figure 1, looking in the direction of the arrows.

1 indicates an endless belt preferably of metal, passing around a pair of rolls 2 and 3 mounted respectively upon the shafts 4 and 5 journalled in the standards 6 and 7, as will be clear from Figure 1 of the drawings. Said standards 6 and 7 are provided with extensions 8 and 9, forming supports for the housing 10, which housing is provided with the ends walls 11 and 12 and with the transversely extending intermediate walls or baffles 13, 14, 15 and 16, providing the chambers 17, 18, 19, 20 and 21. The end walls 11 and 12, as well as the intermediate walls 13, 14, 15 and 16 are provided at their lower portions adjacent the floor or bottom 22 with apertures 23 through which the belt 1 may pass, said apertures being of sufficient dimensions to accommodate the material carried by the said belt, all as will more fully appear below.

The chambers 17, 18, 19, 20, and 21 formed within the housing 10 constitute drying or baking chambers and they are adapted to be heated in any suitable manner, as by the heating elements 25, 26, 27, 28, and 29, here shown as fluid fuel burners supplied from the fuel supply pipe 30 and controlled respectively by the valves 31, 32, 33, 34, and 35. The said heating elements together with their supply pipes and control valves may be supported in any suitable manner as for example by means of the supports 36 secured to and depending from the bottom 22 of the housing 10, substantially as shown.

In order to supply the material which is to be cooked to the traveling belt 1 any suitable form of apparatus may be employed, depending upon the nature of the material being handled. In the present instance, I have shown a hopper member 40 supported on the upright extension 41 of the standard 6, which hopper is provided with a hinged cover member 42 and with a plurality of feed openings 43 at approximately its lowermost portion. Within the said hopper member 40 there is provided a suitable agitating and feeding member comprising a plurality of paddles 45 carried by a rotatable shaft 46 and adapted to co-act with the feed openings 43 in such a manner as to cause the material being handled to be released therefrom in the form of drops or pellets, as will presently appear. The said shaft 46 carries upon one end a pulley 47 around which passes a belt 48, which latter engages a pulley 49 carried by the shaft 4. The shaft 5 is also provided with a pulley 50, around which passes a belt 51, which may be driven from any suitable source of power, not shown.

The operation of the apparatus will be clear from the foregoing, but may be briefly summarized as follows:

The hopper 40 being substantially completely filled with the material to be baked which material may be in the form of a relatively thin dough or batter, the fluid fuel burners 25, 26, 27, 28 and 29 are lighted and power is supplied to the device from the belt 51. This causes rotation of the pulley 50, the shaft 5 and the drum 3, thereby causing the belt 1 to travel in the direction of the arrows indicated in Figure 1, and power is transmitted through the belt 1 to the drum 2 and shaft 4 from whence it is transmitted through the pulleys 49 and 47 and belt 48 to the shaft 46 carrying the feeding or agitating device within the said hopper 40.

The batter within the hopper 40 is of such a consistency and the feed openings 43 are of such dimensions that the said batter will tend to flow more or less freely through the said openings and as the paddles 45 are revolved past the said openings they serve to cut off or interrupt momentarily the flow of the batter therethrough so that the material is fed in drops or pellets such as 55 onto the traveling belt 1. As the said belt moves, these drops or pellets are conveyed through the openings 23 into the chamber 17, where they are subjected to the action of the heat supplied by the heating elements 25. The belt 1 continuing to move carries the drops of batter successively from the chamber 17 into the chambers 18, 19, 20, and 21, where they are in turn subjected to the heat supplied by the heating elements 26, 27, 28, and 29, whereby the moisture contained therein is evaporated and the material is suitably cooked to produce the particular form of product which is being manufactured. The drops finally emerge from the chamber 21 at the right hand end of the machine as seen in Figure 1, and there discharged from the belt 1 as it passes around the drum 3 into any suitable receiving member, not shown.

The heating elements 25, 26, 27, 28 and 29 may be suitably regulated by means of the control valves 31, 32, 33, 34, and 35 so that each one of the said elements will produce within its respective chamber a desired predetermined degree of heat. That is to say, the temperature of the chamber 17, for example, may be raised to say 400°F., by its heating element 25, while the various other heating elements 26, 27, 28, and 29 may be so regulated that the temperature within the chamber 18 may be say, 350° F., that in the chamber 19, say, 300° F., that in the chamber 20 say 250° F., and that in the chamber 21, say 200° F. Such variation in the temperatures of the respective chambers is desirable in producing certain classes of food products, such for example, as that disclosed and claimed in my said copending application #463,957.

On the other hand, in producing other classes of food products, it may only be necessary to subject the material to the action of one degree of heat. In this case, the heating elements 25, 26, etc., may be so controlled that any desired temperature may be produced in all of the said chambers 17, 18, 19, 20 and 21, in which case the housing 10 in effect constitutes but a single chamber.

In producing certain classes of food products such, for example, as the flaked food product disclosed in my said copending application #463,957, it is desirable that the material from the hopper 40 be deposited upon the belt 1 from a considerable height so that air which is unavoidably entrained in the batter during its mixing operation may be given an opportunity to escape. To this end the hopper 40 may be elevated a suitable distance, say, three feet or more above the belt 1, so that the drops such as 55 will have to fall a sufficient distance to enable such entrained air to leave them. On the other hand, in working with certain other food products, it may be desirable to retain such entrained air, and in that case the hopper 40 should be placed relatively close to the belt 1, so that the material fed therefrom will not have to fall from a very great distance.

Such details as this, however, vary with each particular material and product being manufactured, and can be readily determined in advance by those skilled in the art.

It is therefore obvious that those skilled in the art may vary the details of construction as well as the arrangement of parts without departing from the spirit of the invention, and therefore it is not wished to be limited to the above disclosure except as may be required by the claims.

What I claim is:

1. In an apparatus of the class described, the combination of a closed chamber; a movable conveyor passing through said chamber; a heating element associated with said chamber adapted to raise the temperature therein; means comprising a hopper provided with an agitator for feeding material in the form of droplets to said conveyor; means to support said hopper above said conveyor a distance sufficient to permit the formation of said droplets in the air before they reach said conveyor; and means for moving said conveyor, substantially as described.

2. In an apparatus of the class described, the combination of a closed chamber; a movable conveyor passing through said chamber; a heating element associated with said chamber adapted to raise the temperature therein; means comprising a hopper for holding a thin batter and feeding the same in the form of droplets to said conveyor; means to support said hopper above said conveyor a distance sufficient to permit the formation of said droplets in the air before they reach said conveyor; and means for moving said conveyor, substantially as described.

3. In an apparatus of the class described, the combination of a closed chamber; a movable conveyor passing through said chamber; a heating element associated with said chamber adapted to raise the temperature therein; means for feeding a thin batter to said conveyor in the form of droplets; means to support said feeding means at a sufficient height to permit the escape of the air entrained in said droplets before they reach said conveyor; and means for moving said conveyor, substantially as described.

4. In an apparatus of the class described, the combination of a closed chamber; a movable conveyor passing through said chamber; a heating element associated with said chamber adapted to raise the temperature therein; means for feeding a thin batter material to said conveyor in the form of droplets, said means comprising a hopper member provided with a feed opening; means co-acting with said feed opening to interrupt the flow of batter material therethrough whereby it is fed to said conveyor in a divided state; means to support said feeding means at a sufficient height to permit the escape of air from said droplets before they reach said conveyor; and means for moving said conveyor, substantially as described.

5. In an apparatus of the class described, the combination of a closed chamber; a movable conveyor passing through said chamber; a heating element associated with said chamber adapted to raise the temperature therein; means for dropping batter material onto said conveyor from a height, said means comprising an elevated hopper member provided with a feed opening; means comprising a plurality of rotatable paddle members co-acting with said feed opening to interrupt the flow of batter material therethrough whereby it is fed to said conveyor in the form of droplets; and means for moving said conveyor, substantially as described.

6. In an apparatus of the class described, the combination of a housing provided with dividing walls forming a plurality of substantially closed chambers; an endless belt passing through said chambers; a heating element associated with each of said chambers adapted to raise the temperature therein; means for controlling each heating element whereby the temperature within each chamber may be regulated at will; means for dropping from a height a thin batter material onto said conveyor in the form of droplets; and means for moving said conveyor, substantially as described.

7. In an apparatus of the class described, the combination of a housing provided with dividing walls forming a plurality of substantially closed chambers; an endless belt passing through said chambers; a heating element associated with each of said chambers adapted to raise the temperature therein; means for controlling each heating element, whereby the temperature within each chamber may be regulated at will; means comprising an elevated hopper provided with a feed opening adapted to drop a thin batter material onto said conveyor in the form of droplets; means comprising a plurality of rotatable paddle members co-acting with said feed opening to interrupt the flow of batter material therethrough, whereby it is fed to said conveyor in droplets; connections between said conveyor and said paddle members for rotating the latter; and means for moving said conveyor, substantially as described.

In testimony whereof I affix my signature.

NATHAN MININBERG.